(12) United States Patent
Takabayashi

(10) Patent No.: US 7,104,642 B2
(45) Date of Patent: Sep. 12, 2006

(54) ACTIVE RAY CURABLE INK JET SOLVENTLESS INK, IMAGE FORMING METHOD USING THE SAME, AND INK JET RECORDING APPARATUS

(75) Inventor: Toshiyuki Takabayashi, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 315 days.

(21) Appl. No.: 10/718,407

(22) Filed: Nov. 20, 2003

(65) Prior Publication Data

US 2004/0099170 A1    May 27, 2004

(30) Foreign Application Priority Data

Nov. 27, 2002   (JP) .............................. 2002-343435

(51) Int. Cl.
*G01D 11/00* (2006.01)
*B41J 2/17* (2006.01)

(52) U.S. Cl. ........................................ 347/100; 347/95

(58) Field of Classification Search ................ 347/100, 347/95, 96, 101, 102; 523/160; 106/31.13, 106/31.27, 31.6
See application file for complete search history.

(56) References Cited

U.S. PATENT DOCUMENTS

| 4,003,751 | A |  | 1/1977 | Carder |  |
|---|---|---|---|---|---|
| 5,275,646 | A |  | 1/1994 | Marshall et al. |  |
| 5,721,020 | A | * | 2/1998 | Takami et al. | ............... 427/508 |
| 6,435,677 | B1 | * | 8/2002 | Koitabashi et al. | ......... 347/100 |
| 6,959,986 | B1 | * | 11/2005 | Ushirogouchi et al. | ..... 347/100 |
| 2003/0149130 | A1 | * | 8/2003 | Kondo | ........................ 523/160 |

FOREIGN PATENT DOCUMENTS

| EP | 0 540 203 A1 | 5/1993 |
|---|---|---|
| GB | 2 346 889 | 8/2000 |
| WO | PCT WO 2004/026978 | 4/2004 |

* cited by examiner

*Primary Examiner*—Manish S. Shah
(74) *Attorney, Agent, or Firm*—Lucas & Mercanti LLP

(57) ABSTRACT

An active ray curable ink jet solventless ink contains: a bifunctional or higher acrylate compound having a structure expressed by general formula (1) in an amount of less than 35% by mass, and a monofunctional acrylate compound in an amount of 65% by mass or more: wherein the general formula (1) is —(—R—O—)$_n$— where, R represents an alkyl group, and n represents an integer of 1 or larger.

22 Claims, 2 Drawing Sheets

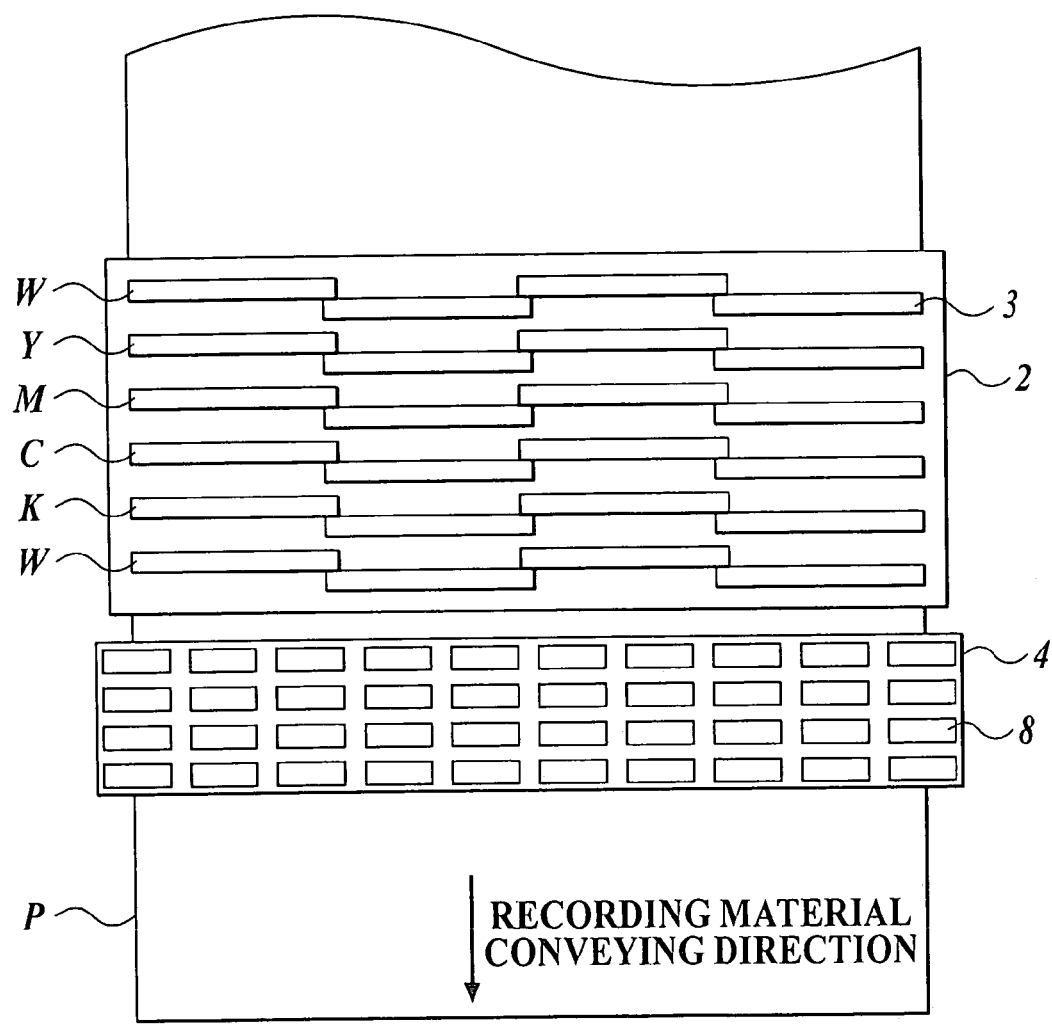

ACTIVE RAY CURABLE INK JET SOLVENTLESS INK, IMAGE FORMING METHOD USING THE SAME, AND INK JET RECORDING APPARATUS

BACKGROUND OF THE INVENTION

1. Field of the Invention

The present invention relates to an active ray curable ink jet solventless ink, an image forming method using the same, and an ink jet recording apparatus.

2. Description of the Related Art

In recent years, ink jet recording system has been widely applied in various printing fields including photograph, miscellaneous printings, marking, special printing for color filer or the like, by virtue of its simplicity and inexpensiveness in image formation. In particular, it has also been made possible to obtain image quality equivalent to that of silver salt photograph by using recording apparatuses capable of ejecting and controlling fine ink dots, or using inks having an improved color reproducibility, durability and ejection suitability in combination with specialized paper having a largely improved ink absorption property, color developing property for colorant materials and surface glossiness. That is, the improved image quality of the recent ink jet recording system cannot be accomplished without a perfect combination of the recording apparatus, ink and specialized paper.

The ink jet system always in need of the specialized paper, however, limits the range of available recording media, and undesirably increases cost for the recording media. Much effort has thus been made on recording by the ink jet system onto media to be printed which differs from the specialized paper. Specific examples of the ink jet system include phase-transfer ink jet system using a solid wax ink at room temperature, solvent ink jet system using an ink mainly composed of a quick-drying solvent, and active ray curable ink jet system allowing the ink to crosslink by UV or electron beam irradiation after recording an image.

Among others, the UV ink jet system has recently attracted public attention because of its various advantages over the solvent ink jet system in that it is causative of only a relatively low odor, has a quick-drying property, and allows recording on media having no ink absorption property. For example, Japanese Laid-Open Patent Publication No. 6-200204, and Published Japanese Translation of PCT International Publication for Patent Application No. 2000-504778 disclose ultraviolet ray curable ink jet inks.

It is, however, impossible to form high-definition images on various recording material even with these inks, because ink dot diameter after the placement tends to largely vary depending on types of the recording material or working environment.

Specific examples of the ultraviolet ray curable ink ever proposed include radical-polymerizable ultraviolet ray curable inks using photo-polymerizable compounds mainly composed of acryl-base compositions (see European Patent No. 540,203, Brochure of International Publication No. 97/31,071 and Brochure of International Publication No. 99/29,788, for example), but the following problems remain unsolved.

The radical-polymerizable ultraviolet ray curable ink is labile to oxygen inhibition in an oxygen-participated environment because of its polymerization mechanism, and tends to degrade the curing property so as to degrade the image quality. The large curing shrinkage thereof is also causative of wrinkle formation or curling of the recording material.

The radical-polymerizable compounds are also disadvantageous in that they generally have a large viscosity, and thus make it difficult to form high-definition images by the ink jet recording due to their insufficient ejection stability.

SUMMARY OF THE INVENTION

An object of the present invention is to provide an active ray curable ink jet solventless ink, an image forming method using the ink and an ink jet recording apparatus, which are capable of forming high-definition images in a highly reproducible manner without ruining texture of printed matters even when the ink having an active ray curable property is ejected by the ink jet system onto a variety of recording materials.

In order to achieve the above-described object, in accordance with the first aspect of the invention, an active ray curable ink jet solventless ink comprises: a bifunctional or higher acrylate compound having a structure expressed by general formula (1) in an amount of less than 35% by mass, and a monofunctional acrylate compound in an amount of 65% by mass or more:

wherein the general formula (1) is

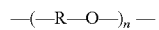

where, R represents an alkyl group, and n represents an integer of 1 or larger.

In accordance with the second aspect of the invention, an active ray curable ink jet solventless ink comprises: a bifunctional or higher acrylate compound having a structure expressed by general formula (1) in an amount of less than 80% by mass, and a trifunctional or higher acrylate compound in an amount of less than 10% by mass:

wherein the general formula (1) is

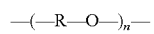

where, R represents an alkyl group, and n represents an integer of 1 or larger.

The active ray curable ink jet solventless ink may comprise: a bifunctional or higher acrylate compound having a structure expressed by the general formula (1) in an amount of less than 35% by mass, a monofunctional acrylate compound in an amount of 65% by mass or more, and a trifunctional or higher acrylate compound in an amount of less than 10% by mass.

The active ray curable ink jet solventless ink may further comprise at least one species of tertiary amine compound.

The active ray curable ink jet solventless ink may further comprise at least one species of photo-polymerizable tertiary amine monomer.

The active ray curable ink jet solventless ink may have an ink viscosity of 35 to 70 mPa·s at 30° C.

In accordance with the third aspect of the invention, an image forming method for forming an image on a recording material, comprises:

ejecting ink droplets of the above active ray curable ink jet solventless ink through an ink jet recording head, and irradiating the ink with an active ray within 0.001 to 2.0 seconds after the ink droplets reach the recording material.

In accordance with the fourth aspect of the invention, an image forming method for forming an image on a recording material, comprises:

ejecting ink droplets of the above active ray curable ink jet solventless ink through an ink jet recording head, and irradiating the ink with an active ray after the ink droplets reach the recording material;

wherein the total thickness of ink film obtained after the ink droplets are cured by irradiating the ink droplets with the active ray, measures 2 to 20 μm.

In accordance with the fifth aspect of the invention, an image forming method for forming an image on a recording material, comprises:

ejecting ink droplets of the above active ray curable ink jet solventless ink through an ink jet recording head, wherein each ink droplet ejected from the nozzles of the ink jet recording head, amounts 1 to 15 pl.

The recording material may be non-absorptive.

In accordance with the sixth aspect of the invention, in an ink jet recording apparatus used for the above image forming method, the total power consumption of a light source for irradiating the ink with the active ray, amounts less than 1 kw·hr.

The present inventors found out that the ejection stability can dramatically be improved, and high-definition images can be obtained in a highly reproducible manner without causing wrinkle formation during curing of the ink nor causing curling of the recording materials, by using an active ray curable ink jet solventless inkcontaining a bifunctional or higher acrylate compound having an alkylene oxide structure expressed by the foregoing general formula (1) in an amount of less than 35% by mass, and a monofunctional acrylate compound in an amount of 65% by mass or more. The present inventors also found that similar excellent effect can be exhibited also by an active ray curable ink jet solventless inkcontaining a bifunctional or higher acrylate compound having an alkylene oxide structure expressed by the foregoing general formula (1) in an amount of less than 80% by mass, and a trifunctional or higher acrylate compound in an amount of less than 10% by mass, and particularly by an active ray curable ink jet solventless inkcontaining a bifunctional or higher acrylate compound having an alkylene oxide structure expressed by the foregoing general formula (1) in an amount of less than 35% by mass, a monofunctional acrylate compound in an amount of 65% by mass or more, and a trifunctional or higher acrylate compound in an amount of less than 10% by mass.

The method of image forming method using the active ray curable ink jet solventless ink of the present invention is particularly effective for the case where the recording material is composed of non-absorptive ones such as plastic films.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein;

FIG. 2 is a plan view of an another exemplary constitution of an essential portion of the ink jet recording apparatus according to the present invention.

DETAILED DESCRIPTION OF THE PREFERRED EMBODIMENTS

Figure 1:
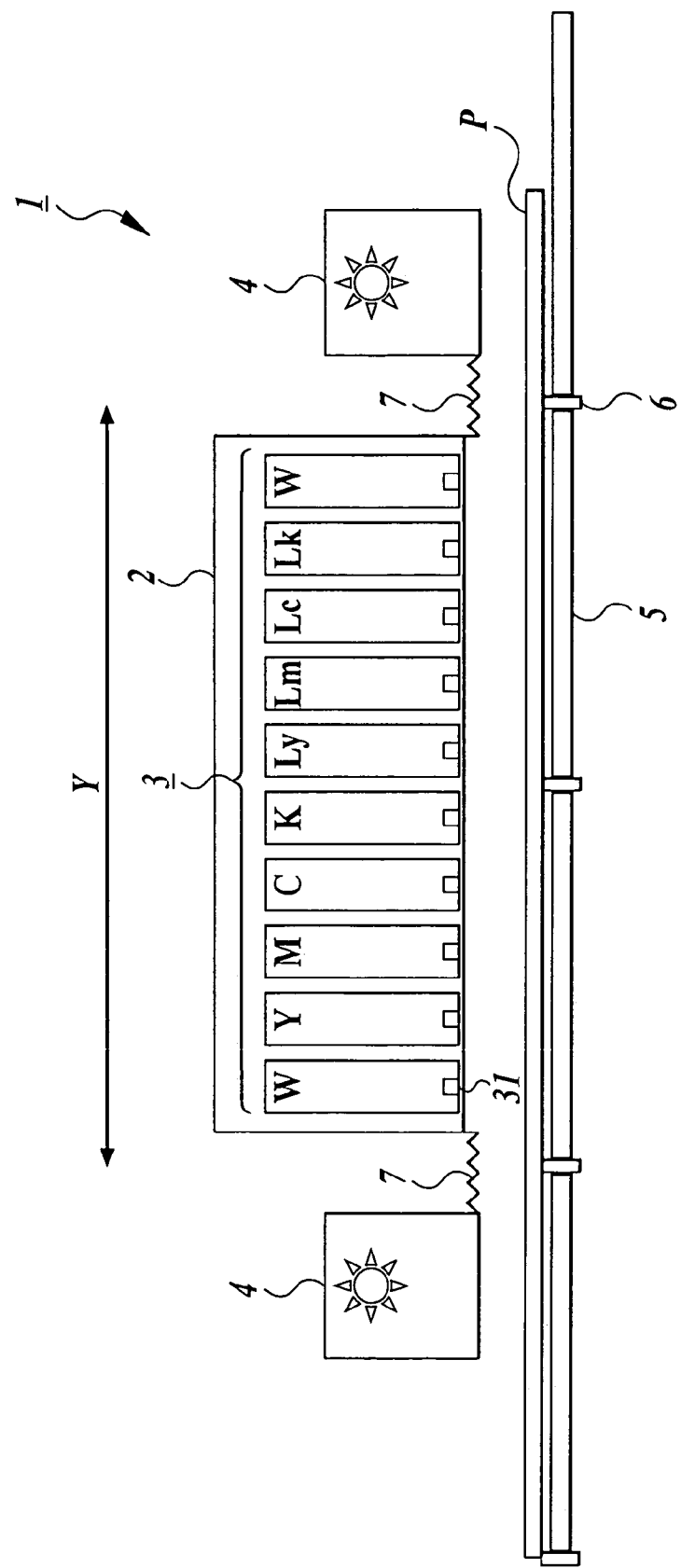
FIG. 1 is a front view of an exemplary constitution of an essential portion of the ink jet recording apparatus according to the present invention.

The following paragraphs will detail the present invention.

<<Active Ray Curable Ink Jet Solventless Ink>>

First, the active ray curable ink jet solventless ink (also referred to as "ink", hereinafter) will be explained.

The ink of the present invention comprises at least a polymerizable monomer and a photo-initiator.

The polymerizable monomer may be various species of (meth)acrylate monomer, and examples thereof include monofunctional monomers such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxyethyl hexahydrophthalic acid, butoxyethyl acrylate, ethoxy diethylene glycol acrylate, methoxy diethylene glycol acrylate, methoxy polyethylene glycol acrylate, methoxy propylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethyl succinic acid, 2-acryloyloxyethyl phthalic acid, 2-acryloyloxyethyl-2-hydroxyethyl phthalic acid, lactone-modified flexible acrylate and t-butyl cyclohexyl acrylate; bifunctional monomers such as triethylene glycol diacrylate, tetraethylene glycol diacrylate, polyethylene glycol diacrylate, tripropylene glycol diacrylate, polypropylene glycol diacrylate, 1,4-butane diol diacrylate, 1,6-hexanediol diacrylate, 1,9-nonanediol diacrylate, neopentyl glycol diacrylate, dimethylol tricyclodecane diacrylate, diacrylate of EO (ethylene oxide) adduct of bisphenol-A, diacrylate of PO (propylene oxide) adduct of bisphenol-A, hydroxypivalic acid neopentyl glycol diacrylate and polytetramethylene glycol diacrylate; and trifunctional or higher multifunctional monomer such as trimethylolpropane triacrylate, EO-modified trimethylolpropane triacrylate, pentaerythritol triacrylate, pentaerythritol tetraacrylate, dipentaerythritol hexaacrylate, ditrimethylolpropane tetraacrylate, glycerinpropoxy triacrylate, caprolactone-modified trimethylolpropane triacrylate, pentaerythritolethoxy tetraacrylate and caprolactam-modified dipentaerythritol hexaacrylate.

Besides these, also polymerizable oligomers can be blended similarly to the monomers. The polymerizable oligomers include epoxyacrylate, aliphatic urethane acrylate, aromatic urethane acrylate, polyester acrylate and straight-chained acryl oligomer.

Taking sensitivity, skin irritativeness, eye irritativeness, mutagenicity and toxicity into consideration, particularly preferable examples of the above-described monomers include isoamyl acrylate, stearyl acrylate, lauryl acrylate, octyl acrylate, decyl acrylate, isomyristyl acrylate, isostearyl acrylate, ethoxy diethylene glycol acrylate, methoxypolyethylene glycol acrylate, methoxy propylene glycol acrylate, isobornyl acrylate, lactone-modified flexible acrylate, tetraethylene glycol diacrylate, polyethylene glycol diacrylate, polypropylene glycol diacrylate, EO-modified trimethylolpropane triacrylate, dipentaerythritol hexaacrylate, ditrimethylolpropane tetraacrylate, glycerin propoxy triacrylate, caprolactone-modified trimethylolpropane triacrylate, pentaerythritolethoxy tetraacrylate, and caprolactam-modified dipentaerythritol hexaacrylate.

Still further preferable examples of these include stearyl acrylate, lauryl acrylate, isostearyl acrylate, ethoxy diethylene glycol acrylate, isobornyl acrylate, tetraethylene glycol diacrylate, EO-modified trimethylolopropane triacrylate, glycerin propoxy triacrylate, caprolactone-modified trimethylolpropane triacrylate, and caprolactam-modified dipentaerythritol hexaacrylate.

In view of ensuring compatibility among ejection stability and safety in terms of sensitivity, skin irritativeness, eye irritativeness, mutagenicity and toxicity, the present invention is characterized in containing a bifunctional or higher acrylate compound having an alkylene oxide structure expressed by the foregoing general formula (1) in an amount of less than 80% by mass, and more preferably in an amount of 20% by mass or more and less than 80% by mass.

In the foregoing general formula (1), the alkyl group expressed by R is preferably a $C_2$ to $C_4$ alkylene group, and more preferably the general formula (1) is expressed as (—$CH_2CH_2$—O)$_n$— (EO: ethylene oxide) or ($CH_2CH(CH_3)$—O—)$_n$— (PO: propylene oxide).

The ink of the present invention is characterized not only in that it contains the bifunctional or higher acrylate compound having the alkylene oxide structure expressed by the general formula (1) in an amount of less than 35% by mass, but also in that it contains a monofunctional acrylate compound in an amount of 65% by mass or more in view of ensuring ejection stability, more preferably in an amount of 65 to 95% by mass, and still more preferably in an amount of 65 to 80% by mass.

The ink of the present invention is characterized not only in that it contains the bifunctional or higher acrylate compound having the alkylene oxide structure expressed by the general formula (1) in an amount of less than 80% by mass, but also in that it contains a trifunctional or higher acrylate compounds in an amount of less than 10% by mass in view of ensuring ejection stability, more preferably in an amount of 0.1% by mass or more and less than 10% by mass, and still more preferably in an amount of 1.0% by mass or more and less than 10% by mass.

Still more preferably, the ink of the present invention is characterized not only in that it contains the bifunctional or higher acrylate compound having the alkylene oxide structure expressed by the general formula (1) in an amount of less than 35% by mass, but also in that it contains a monofunctional acrylate compound in an amount of 65% by mass or more, and a trifunctional or higher acrylate compounds in an amount of less than 10% by mass.

It is preferable that the ink of the present invention is preferably added with a tertiary amine compound in order to suppress the curing shrinkage of the ink.

The target tertiary amine compound is not specifically limited so far as it is derived from ammonia having all of three hydrogen atoms thereof independently substituted by alkyl group, hydroxyalkyl group or aralkyl group, and any publicly-known compounds may be used. Specific examples thereof include triethylamine, tri-n-propylamine, tri-n-butylamine., dimethylethanolamine, diethylethanolamine, triethanolamine, N,N-dimethylbenzylamine, N,N-diethylbenzylamine and N,N-dimethylphenetylamine, but not limited thereto.

It is further preferable in the present invention to use the photo-polymerizable tertiary amine monomer for the purpose of suppressing the curing shrinkage of the ink.

The photo-polymerizable tertiaryamine monomer refers to a sort of compound composed of the aforementioned polymerizable monomer bonded with a tertiary amino group, and examples of which include amine monomers such as N-ethyl (meth)acrylamide, N-n-propyl (meth)acrylamide, N-isopropyl (meth)acrylamide, N-cyclopropyl (meth)acrylamide, N-methyl-N-ethyl (meth)acrylamide, N,N-dimetyl (meth)acrylamide, N,N-diethyl (meth)acrylamide, N,N-dimethylaminoethyl (meth)acrylamide, N,N-dimethylaminopropyl (meth)acrylamide, N-methyl-N-isopropyl (meth)acrylamide, N-methyl-N-n-propyl (meth)acrylamide, N-(meth)acryloyl morpholine, N-(meth)acryloyl pyrrolidine, N-(meth)acryloyl piperidine, N-vinyl-2-pyrrolidone, N-methylene bisacrylamide, N-methoxypropyl (meth)acrylamide, N-isopropoxypropyl (meth)acrylamide, N-ethoxypropyl (meth)acrylamide, N-1-methoxymethylpropyl (meth) acrylamide, N-methoxyethoxypropyl (meth) acrylamide, N-1-methyl-2-methoxyethyl (meth)acrylamide, N-methyl-N-n-propyl (meth)acrylamide and N-(1,3-dioxolane-2-yl) (meth)acrylamide, while not being limited thereto.

The photo-initiator available in the present invention may be publicly-known ones which are exemplified by aryl alkyl ketone, oxime ketone, thiobenzoic acid S-phenyl, titanocene, aromatic ketone, thioxanthone, benzyl and quinone derivaties, and ketocoumarins.

The photo-initiator is detailed in "UV/EB Koka Gijyutu no Oyo to Shijo (Applications and Market of UV/EB Curing Technology)" (published by CMC Publishing Co., Ltd, edited by Yoneho Tabata, compiled by RadTech Japan), and among others, acylphosphine oxide and acylphosphonate are particularly preferable for internal curing of ink image having a thickness of 5 to 12 μm per one color typically in the ink jet system, because these compounds are high in the sensitivity, and reduces the absorbance upon photo-cleavage thereof. Preferable examples of the species include bis(2,4,6-trimethylbenzoyl)-phenylphosphine oxide and bis(2,6-dimethoxybenzoyl)-2,4,4-trimethyl-pentylphosphine oxide. Preferable examples based on safety-oriented selection similar to that for the above-described monomer include 1-hydroxy-cyclohexyl-phenyl-ketone, 2-methyl-1-[4-(metylthio)phenyl]-2-morpholinopropene-1-one, bis(2,6-dimethoxybenzoyl)-2,4,4-trimethyl-pentylphosphine oxide, and 2-hydroxy-2-methyl-1-phenylpropane-1-one (Darocure® 1173). Preferable amount of addition falls within a range from 1 to 6% by mass of the total weight of the ink composition, and more preferably 2 to 5% by mass.

In the present invention, it is preferable to divide irradiation of active ray into two steps while varying the wavelength or intensity therebetween, in view of raising the adhesion property and followability of the ink film onto the recording material, and it is particularly preferable, also for the initiator, to use two or more species differing in the absorption wavelength.

Coloring of the ink composition, if desired, is allowable by adding colorant materials. The colorant materials available herein may be such as those soluble or dispersible into the major component of the polymerizable compound, and are preferably pigments in view of weatherability.

Examples of the available pigments include:
C.I. Pigment Yellow-1, 3, 12, 13, 14, 17, 81, 83, 87, 95, 109 and 42;
C.I. Pigment Orange-16, 36 and 38;
C.I. Pigment Red-5, 22, 38, 48:1, 48:2, 48:4, 49:1, 53:1, 57:1, 63:1, 144, 146, 185 and 101;
C.I. Pigment Violet-19 and 23;
C.I. Pigment Blue-15:1, 15:3, 15:4, 18, 60, 27 and 29;
C.I. Pigment Green-7 and 36;
C.I. Pigment White-6, 18 and 21; and
C.I. Pigment Black-7, while not being limited thereto.

It is also preferable in the present invention to use a white ink in order to improve masking property of colors on transparent base materials such as plastic films.

The pigment may be dispersed using any publicly-known dispersion apparatus, and examples of the apparatus include ball mill, sand mill, Attritor, roll mill, agitator, Henschel mixer, colloid mill, ultrasonic homogenizer, pearl mill, wet jet mill and paint shaker. It is also allowable to add a dispersant in the process of the pigment dispersion, where a polymer dispersant is preferably used as the dispersant. Solsperse series manufactured by Avecia Ltd. is one preferable example of the polymer dispersant. It is also allowable to use, as a dispersion auxiliary, a synergist suitable for each pigment. These dispersant and dispersion auxiliary are preferably added in an amount of 1 to 50 parts by mass per 100 parts by mass of the pigment.

Although solvent or polymerizable compound is generally used as a dispersion medium for dispersing the pigment, no solvent is used in the present invention because the ink is reacted and cured immediately after the placement.

Any solvent left unremoved in the cured image undesirably results in a degraded solvent resistance and raises a problem of VOC (volatile organic compound) due to the residual solvent. The dispersion medium used in the present invention therefore excludes the solvents, but is preferably selected from polymerizable compounds, and particularly from monomers having a viscosity of a minimum level, in view of ensuring desirable pigment dispersion.

The average particle size of the dispersed pigment particle preferably falls within a range from 0.08 to 0.5 µm, where material selection for the pigment, dispersant and dispersion medium, and conditions for dispersion and filtration are appropriately proceeded so as to adjust the maximum particle size to 0.3 to 10 µm, and more preferably to 0.3 to 3 µm. The precise control of the pigment particle can successfully suppress clogging in nozzles of the recording head, and can properly maintain desirable levels of the storage stability, transparency and curing sensitivity of the ink. The colorant material is added preferably in an amount of 1 to 10% by mass of the total weight of the ink.

The ink of the present invention preferably has a viscosity at 30° C. of 35 to 70 mPa·s in view of ensuring stable ejection irrespective of the curing environment (temperature and humidity), and a desirable curing property.

<<Image Forming Method>>

The next paragraphs will describe the image forming method of the present invention.

(Ink Ejection Conditions)

To ensure a desirable ejection stability, one preferable ink ejection condition relates to heating of the recording head and the ink up to 35° C. to 100° C. Because the active ray curable ink is susceptible to temperature changes and tends to largely vary the viscosity thereof, where changes in the viscosity directly affects the droplet size and the droplet ejection speed to a considerable degree, to thereby degrade image quality. It is therefore necessary to keep the temperature of the heated ink at a constant level. A controllable range for the ink temperature falls within the set temperature ±5° C., more preferably set temperature ±2° C., and still more preferably set temperature ±1° C.

In the present invention, the amount of droplet ejected from the individual nozzles is preferably 2 to 15 pl.

Despite it has been known that the above-described level of amount of droplet ejection is intrinsically necessary to form high-definition images, most of the ink jet recording apparatuses using the conventional active ray curable ink could only eject the ink in an amount of as much as 20 µl or more, and were not successful in forming the high-definition images.

(Light Irradiation Conditions after Ink Placement)

In the image forming method of the present invention, the active ray is preferably irradiated within 0.001 seconds to 2.0 seconds after the placement of the ink droplet onto the recording material, and more preferably within 0.001 seconds to 1.0 second. It is preferable to use a recording apparatus configured as shown later in FIG. 1 or FIG. 2, and the above-described irradiation can be accomplished by disposing, between every adjacent heads for the individual colors, an irradiation light source which typically comprises an array of a plurality of LEDs. Irradiation timing as early as possible is particularly essential for formation of the high-definition images.

(Total Thickness of Ink Film after Ink Placement)

In the present invention, total thickness of the ink film formed by placing the ink on the recording material, and irradiating the active ray for curing, preferably falls within a range from 2 to 20 µm. The total thickness of the ink film generally exceeds 20 µm in the present status of active ray curable ink jet recording in the field of screen printing, but the ink ejection causative of an excessive film thickness is not desirable in the field of flexible packaging in which thin plastic materials are most often used as the recording material, because the excessive thickness may be causative of not only problems in curling and wrinkling of the recording material, but also in undesirable changes in the stiffness and texture of the printed matter as a whole.

It is to be noted that the "total thickness of the ink film" in the context herein means a maximum value of the ink film thickness placed on the recording material, and the definition will apply to all cases irrespective of that the ink jet recording is made in a single color, or in two colors (secondary color), three colors or four colors (white ink base).

The total ink film thickness can successfully be adjusted to the above-described range, by ejecting the high-concentration ink in an amount of ejection of the droplets in the range as small as described in the above.

It has been a general practice in the conventional active ray curable ink jet system to use high-luminance light sources showing a total power consumption of the lamps (irradiation light sources) exceeding 1 kW·hr in order to suppress the spreading or blotting of the ink dots after the placement. These light sources were, however, practically unavailable for printing on shrinkable labels or the like, because they are causative of too large curling or shrinkage of the recording material.

In the present invention, it is preferable that the total power consumption of the lamps for irradiating the active ray amounts less than 1 kW·hr. Examples of the light sources capable of suppressing the total power consumption to as small as less than 1 kW·hr include fluorescent tube, cold cathode ray tube and LED.

In the present invention, it is particularly effective to use a non-absorptive recording material as the recording material, and to form images thereon using the image forming method, or using the ink jet recording apparatus of the present invention. It is to be noted that "non-absorptive" herein means "to absorb no ink", and the non-absorptive recording material in the present invention is defined as the material showing the amount of ink transfer of less than 0.1 ml/mm$^2$, and substantially 0 ml/mm$^2$ when measured in compliance to the Japan TAPPI Paper and Pulp Testing method No. 51-87 or the liquid absorbance test method for paper or board (Bristow's method).

The non-absorptive recording material available in the present invention includes not only general non-coated and coated papers, but also includes a variety of non-absorptive plastics and films thereof used for so-called flexible packaging. Examples of the plastic films include polyethylene terephthalate (PET) film, oriented polystyrene (OPS) film, oriented polypropylene (OPP) film, oriented nylon (ONy) film, polyvinyl chloride (PVC) film, polyethylene(PE) film and triacetyl cellulose (TAC) film. Other available plastics include polycarbonate, acrylic resin, ABS, polyacetal, PVA and rubbers. Metals and glasses are also available. Among others, the configuration of the present invention is particularly advantageous when images are formed on heat-shrinkable films such as PET film, OPS film, OPP film, ONy film and PVC film. These recording materials have been suffering from problems in curing shrinkage of the ink and heat generation during the curing reaction, and also from problems in curling or deformation of the films possibly occurs during irradiation using a conventional high-pressure mercury lamp or metal halide lamp due to heat generated by the lamps.

There has been another problem in that surface energies of the plastic films largely differ from each other, and this resulted in variable dot diameter after placement of the ink depending on species of the recording material. Whereas the configuration of the present invention is successful in forming high-definition images on a wide variety of recording materials having a surface energy ranging from 0.035 to 0.06 $J/m^2$, which covers from OPP film or OPS film having a relatively small surface energy to PET film having a relatively large surface energy. The effects of the present invention can more preferably be obtained by using the recording materials having a surface energy of 0.040 to 0.06 $J/m^2$.

In the present invention, it is more advantageous to use a long (web) recording material in view of reducing costs for the packaging, production and recording material, raising the printing efficiency, and ensuring adaptability to printing in various sizes.

<<Ink Jet Recording Apparatus>>

An ink jet recording apparatus available in the present invention will be explained making a proper reference to the attached drawing. It is to be noted that the recording apparatus shown in the drawing below is none other than one embodiment of the ink jet recording apparatus of the present invention, and by no means limited thereto.

FIG. 1 shows an exemplary configuration of the essential portion of the ink jet recording apparatus according to the present invention.

FIG. 1 shows an exemplary configuration of a serial-type ink jet recording apparatus, where a recording apparatus 1 comprises a head carriage (light interceptor) 2, a recording head 3, an irradiation means 4, and a platen portion 5. The recording apparatus 1 has the platen portion disposed under a recording material P. The platen portion 5 is an UV absorber, and can absorb excessive portion of the ultraviolet radiation after transmitted through the recording material P. This ensures formation of high-definition images in a highly stable manner.

The recording material P is guided by guide members 6, and moves from the front to the in-depth direction of FIG. 1 while being operated by a conveyance means (not shown). A head scanning means (not shown) reciprocates the head carriage 2 in direction Y in FIG. 1 so as to effect scanning of the recording head 3 held by the head carriage 2.

The head carriage 2 is disposed over the recording material P, and houses a plurality of the recording heads 3, described later, depending on the number of colors used for image printing made on the printing material, while directing ink ejection portions 31 thereof downwards. The head carriage 2 is also disposed also in a manner freely reciprocating in direction Y in FIG. 1, and reciprocates in that direction while being driven by the head scanning means.

Although FIG. 1 illustrates an exemplary configuration having the head carriage 2 capable of housing the recording heads 3 for white (W), yellow (Y), magenta (M), cyan (C), black (K), light yellow (Ly), light magenta (Lm), light cyan (Lc), light black (Lk) and white (W) inks, the number of colors of the recording heads 3 housed in the head carriage 2 in the practical printing may properly be determined.

Although in FIG. 1 shows the exemplary case having a pair of irradiation means 4 fixed on both ends of the head carriage 2 and almost in parallel with the recording material P, the irradiation means (lamps) may also be disposed between every adjacent recording heads.

The irradiation means 4 has a shape almost equivalent to a maximum region settable by the recording apparatus (UV inkjet printer) out of dot placeable region formed by ejected UV ink during a single scanning of the recording head 3 driven by the head scanning means, or larger than the dot placeable region.

The recording head 3 ejects the active ray curable ink (e.g., ultraviolet ray curable ink) supplied from an ink supply means (not shown) through an ink ejection portion 31 towards the recording material P, with the aid of operation of a plurality of ejection means (not shown) provided inside thereof. The UV ink to be ejected from the recording head 3 comprises a colorant material, a polymerizable monomer and a photo-initiator, and can cure upon irradiation with ultraviolet radiation based on crosslinking and polymerization reaction of the monomers while being catalyzed by the initiator.

The recording head 3 ejects the UV ink in a form of ink droplets towards a predetermined region (ink placeable region) on the recording material P during a single scan, which starts from one end and terminates at the other end of the recording material P, in direction Y in FIG. 1 while being driven by the head scanning means, and allows the ink droplets to be placed in the ink placeable region.

The scanning is repeated in an appropriate number of times to thereby eject the UV ink towards a single ink placeable region, the recording material P is properly moved from the front to the in-depth direction in FIG. 1 with the aid of the conveyance means, the scanning is again repeated to thereby eject the UV ink through the recording head 3 towards the next ink placeable region adjacent to the previous ink placeable region in the in-depth direction of FIG. 1.

By repeating the above operations in which the UV ink is ejected from the recording head as being linked with the motion of the head scanning means and conveyance means, an image comprising a collection of the UV ink droplets is formed on the recording material.

FIG. 1 showed an exemplary configuration of the recording apparatus based on the serial head system, whereas FIG. 2 shows another exemplary configuration of the essential portion of the ink jet recording apparatus according to the present invention.

The ink jet system shown in FIG. 2 is generally refers to the line-head system, in which a plurality of recording heads 3 for the individual colors are disposed in a fixed manner on the head carriage 2 so as to cover the entire width of the recording material P.

On the other hand, on the upstream side of the head carriage 2, an irradiation means 4 is disposed, in which the a plurality of irradiation light sources 8, typified by LEDs or cold cathode ray tubes, are aligned in the main scanning direction and the sub-scanning direction again so as to cover the entire width of the recording material P, and so as to consequently cover the entire region of the ink printing surface.

In the line-head system, image is formed by ink ejection and curing while conveying only the recording material P, and leaving the head carriage 2 and the irradiation means 4 immobilized.

EXAMPLES

The following paragraphs will describe the present invention referring to specific examples, where embodiments of the present invention are by no means limited by these examples.

<<Preparation of Ink Composition Sets>>

(Preparation of Ink Composition Set 1)

<Preparation of K Ink>

Ten parts of Solsperse 32000 (product of Avecia Ltd.) and the photo-polymerizable compounds (*1 to *3) were put in a stainless-steel-made beaker, and the mixture was allowed to solubilize under stirring while being heated on a hot plate at 65° C. for one hour. The mixture was then added with 3.5 parts of C.I.Pigment Black-7, transferred into a polyethylene bottle together with 200 g of zirconia bead of 1 mm diameter, tightly closed, dispersed by shaking using a paint shaker for 2 hours, separated from the zirconia bead, added with the photo radical initiators (*A to *C) listed in Table 1, and mixed by stirring. The obtained solution was then filtered through a 0.8 μm membrane filter, as a preventive measure against clogging in the printer, to thereby obtain a K ink.

<Preparation of C, M, Y, W, Lk, Lc, Lm and Ly Inks>

Inks of the individual colors were prepared similarly to the K ink, except that species and amount of addition of the colorant material, species of the photo-polymerizable compounds (*1 to *3) and photo radical initiators (*A to *C) were selected as listed in Table 1, to thereby obtain ink composition set 1.

(Preparation of Ink Composition Sets 2 to 5)

Ink composition sets 2 to 4 were prepared similarly to the ink composition set 1, except that species and amount of addition of the colorant material, and species and the amount of addition of the photo-polymerizable compounds and photo radical initiators were selected as listed in Tables 2 to 5, and further except that amine compounds were used for the ink composition sets 3 and 4. Further, ink composition set 5 was prepared so as to contain a bifunctional or higher acrylate compound in an amount of less than 80% by mass, and a trifunctional or higher acrylate compound in an amount of less than 10% by mass.

The viscosity of thus-prepared individual ink composition sets are as shown below, where the values are expressed by ranges between the maximum values and minimum values observed for the individual colors:

ink composition set 1: 53 to 56 mPa·s;
ink composition set 2: 28 to 32 mPa·s;
ink composition set 3: 39 to 41 mPa·s;
ink composition set 4: 44 to 46 mPa·s; and
ink composition set 5: 45 to 48 mPa·s.

TABLE 1

| Ink composition set 1 (Comparative example) | Types of ink | Colorant material Type | Colorant material Amount of addition | Photo-polymerizable compound (acrylate compound) *1 | *2 | *3 | Photo radical initiator *A | *B | *C | Polymer dispersant *H |
|---|---|---|---|---|---|---|---|---|---|---|
| | K | Colorant material 1 | 3.5 | 5.0 | 62.0 | 15.0 | 2.0 | 2.0 | 0.5 | 10.0 |
| | C | Colorant material 2 | 2.0 | 7.0 | 64.5 | 12.0 | 2.0 | 2.0 | 0.5 | 10.0 |
| | M | Colorant material 3 | 3.0 | 7.0 | 63.5 | 12.0 | 2.0 | 2.0 | 0.5 | 10.0 |
| | Y | Colorant material 4 | 2.5 | 7.0 | 64.0 | 12.0 | 2.0 | 2.0 | 0.5 | 10.0 |
| | W | Colorant material 5 | 3.5 | 5.0 | 62.0 | 15.0 | 2.0 | 2.0 | 0.5 | 10.0 |
| | Lk | Colorant material 1 | 1.3 | 7.0 | 65.2 | 12.0 | 2.0 | 2.0 | 0.5 | 10.0 |
| | Lc | Colorant material 2 | 0.6 | 7.0 | 65.9 | 12.0 | 2.0 | 2.0 | 0.5 | 10.0 |
| | Lm | Colorant material 3 | 0.8 | 7.0 | 65.7 | 12.0 | 2.0 | 2.0 | 0.5 | 10.0 |
| | Ly | Colorant material 4 | 0.6 | 7.0 | 65.9 | 12.0 | 2.0 | 2.0 | 0.5 | 10.0 |

TABLE 2

| Ink composition set: 2 (Comparative example) | Types of ink | Colorant material Type | Amount of addition | Photo-polymerizable compound (acrylate compound) *1 | *2 | *3 | Photo radical initiator *A | *B | *C | Polymer dispersant *H |
|---|---|---|---|---|---|---|---|---|---|---|
| | K | Colorant material 1 | 3.5 | 67.0 | 7.0 | 8.0 | 2.0 | 2.0 | 0.5 | 10.0 |
| | C | Colorant material 2 | 2.0 | 70.0 | 5.5 | 8.0 | 2.0 | 2.0 | 0.5 | 10.0 |
| | M | Colorant material 3 | 3.0 | 70.0 | 4.5 | 8.0 | 2.0 | 2.0 | 0.5 | 10.0 |
| | Y | Colorant material 4 | 2.5 | 70.0 | 5.0 | 8.0 | 2.0 | 2.0 | 0.5 | 10.0 |
| | W | Colorant material 5 | 3.5 | 67.0 | 7.0 | 8.0 | 2.0 | 2.0 | 0.5 | 10.0 |
| | Lk | Colorant material 1 | 1.3 | 70.0 | 6.2 | 8.0 | 2.0 | 2.0 | 0.5 | 10.0 |
| | Lc | Colorant material 2 | 0.6 | 70.0 | 6.9 | 8.0 | 2.0 | 2.0 | 0.5 | 10.0 |
| | Lm | Colorant material 3 | 0.8 | 70.0 | 6.7 | 8.0 | 2.0 | 2.0 | 0.5 | 10.0 |
| | Ly | Colorant material 4 | 0.6 | 70.0 | 6.9 | 8.0 | 2.0 | 2.0 | 0.5 | 10.0 |

TABLE 3

| Ink composition set 3 (This invention) | Types of ink | Colorant material Type | Amount of addition | Photo-polymerizable compound (acrylate compound) *4 | *5 | *6 | Photo radical initiator *D | *B | *C | Amine compound Amine 1 | Polymer dispersant *H |
|---|---|---|---|---|---|---|---|---|---|---|---|
| | K | Colorant material 1 | 3.5 | 67.0 | 2.5 | 6.0 | 2.0 | 2.0 | 0.5 | 5.0 | 10.0 |
| | C | Colorant material 2 | 2.0 | 70.0 | 3.0 | 5.0 | 2.0 | 2.0 | 0.5 | 5.0 | 10.0 |
| | M | Colorant material 3 | 3.0 | 70.0 | 2.5 | 5.0 | 2.0 | 2.0 | 0.5 | 5.0 | 10.0 |
| | Y | Colorant material 4 | 2.5 | 70.0 | 3.0 | 5.0 | 2.0 | 2.0 | 0.5 | 5.0 | 10.0 |
| | W | Colorant material 5 | 3.5 | 67.0 | 2.5 | 6.0 | 2.0 | 2.0 | 0.5 | 5.0 | 10.0 |
| | Lk | Colorant material 1 | 1.3 | 70.0 | 5.2 | 4.0 | 2.0 | 2.0 | 0.5 | 5.0 | 10.0 |
| | Lc | Colorant material 2 | 0.6 | 70.0 | 5.9 | 4.0 | 2.0 | 2.0 | 0.5 | 5.0 | 10.0 |
| | Lm | Colorant material 3 | 0.8 | 70.0 | 5.7 | 4.0 | 2.0 | 2.0 | 0.5 | 5.0 | 10.0 |
| | Ly | Colorant material 4 | 0.6 | 70.0 | 5.9 | 4.0 | 2.0 | 2.0 | 0.5 | 5.0 | 10.0 |

TABLE 4

| Ink composition set 4 (This invention) | Types of ink | Colorant material Type | Colorant material Amount of addition | Photo-polymerizable compound (acrylate compound) *7 | *2 | *3 | Photo radical initiator *E | *F | *C | Polymerizable amine compound *G | Polymer dispersant *H |
|---|---|---|---|---|---|---|---|---|---|---|---|
| | K | Colorant material 1 | 3.5 | 66.0 | 3.5 | 5.0 | 2.0 | 2.0 | 0.5 | 7.5 | 10.0 |
| | C | Colorant material 2 | 2.0 | 67.0 | 4.0 | 5.0 | 2.0 | 2.0 | 0.5 | 7.5 | 10.0 |
| | M | Colorant material 3 | 3.0 | 67.0 | 3.0 | 5.0 | 2.0 | 2.0 | 0.5 | 7.5 | 10.0 |
| | Y | Colorant material 4 | 2.5 | 67.0 | 3.5 | 5.0 | 2.0 | 2.0 | 0.5 | 7.5 | 10.0 |
| | W | Colorant material 5 | 3.5 | 66.0 | 3.5 | 5.0 | 2.0 | 2.0 | 0.5 | 7.5 | 10.0 |
| | Lk | Colorant material 1 | 1.3 | 67.0 | 4.7 | 5.0 | 2.0 | 2.0 | 0.5 | 7.5 | 10.0 |
| | Lc | Colorant material 2 | 0.6 | 67.0 | 5.4 | 5.0 | 2.0 | 2.0 | 0.5 | 7.5 | 10.0 |
| | Lm | Colorant material 3 | 0.8 | 67.0 | 5.2 | 5.0 | 2.0 | 2.0 | 0.5 | 7.5 | 10.0 |
| | Ly | Colorant material 4 | 0.6 | 67.0 | 5.4 | 5.0 | 2.0 | 2.0 | 0.5 | 7.5 | 10.0 |

TABLE 5

| Ink composition set 5 (This invention) | Types of ink | Colorant material Type | Colorant material Amount of addition | Photo-polymerizable compound (acrylate compound) *7 | *2 | *3 | Photo radical initiator *E | *F | *C | Polymerizable amine compound *G |
|---|---|---|---|---|---|---|---|---|---|---|
| | K | Colorant material 1 | 3.5 | 4.0 | 75.0 | 8.0 | 2.0 | 2.0 | 0.5 | 5.0 |
| | C | Colorant material 2 | 2.0 | 9.5 | 72.0 | 7.0 | 2.0 | 2.0 | 0.5 | 5.0 |
| | M | Colorant material 3 | 3.0 | 8.5 | 72.0 | 7.0 | 2.0 | 2.0 | 0.5 | 5.0 |
| | Y | Colorant material 4 | 2.5 | 9.0 | 72.0 | 7.0 | 2.0 | 2.0 | 0.5 | 5.0 |
| | W | Colorant material 5 | 3.5 | 4.0 | 75.0 | 7.0 | 2.0 | 2.0 | 0.5 | 5.0 |
| | Lk | Colorant material 1 | 3.5 | 8.0 | 72.0 | 7.0 | 2.0 | 2.0 | 0.5 | 5.0 |
| | Lc | Colorant material 2 | 3.5 | 8.0 | 72.0 | 7.0 | 2.0 | 2.0 | 0.5 | 5.0 |
| | Lm | Colorant material 3 | 3.5 | 8.0 | 72.0 | 7.0 | 2.0 | 2.0 | 0.5 | 5.0 |
| | Ly | Colorant material 4 | 3.5 | 8.0 | 72.0 | 7.0 | 2.0 | 2.0 | 0.5 | 5.0 |

Details for the individual inks and compounds listed in Tables 1 to 5 are as follows:
K: black ink;
C: cyan ink;
M: magenta ink;
Y: yellow ink;
W: white ink;
Lk: light black ink;
Lc: light cyan ink;
Lm: light magenta ink;
Ly: light yellow ink;
colorant material 1: C.I. Pigment Black-7;
colorant material 2: C.I. Pigment Blue-15:3;
colorant material 3: C.I. Pigment Red-57:1;
colorant material 4: C.I. Pigment Yellow-13;
colorant material 5: titanium oxide (anatase-type, average particle size=0.20 μm).

[Photo-polymerizable Compounds]
1: methoxy propylene glycol acrylate (monofunctional acrylate compound);

2: polypropylene glycol (PO-containing) diacrylate (bifunctional acrylate compound);
3: caprolactam-modified dipentaerythritol hexaacrylate (hexafunctional acrylate compound);
4: stearyl acrylate (monofunctional acrylate compound);
5: tetraethylene glycol (EO-containing) diacrylate (bifunctional acrylate compound);
6: trimethylolpropane triacrylate (trifunctional acrylate compound;
7: ethoxy diethylene glycol acrylate (monofunctional acrylate compound).

[Photo Radical Initiators]
A: Irgacure 1850 (product of Ciba Specialty Chemicals);
B: Irgacure 651 (product of Ciba Specialty Chemicals);
C: diethylthioxanthone;
D: Irgacure 184 (product of Ciba Specialty Chemicals);
E: Irgacure 1800 (product of Ciba Specialty Chemicals);
F: Irgacure 500 (product of Ciba Specialty Chemicals).

[Amine compounds]
G: 2-(dimethylamino)ethyl methacrylate (DMAEMA); and
H: Solsperse 32000 (product of Avecia Ltd.).
G: polymerizable amine compound (DMAEMA)

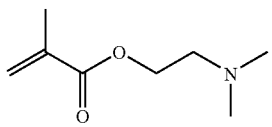

amine 1

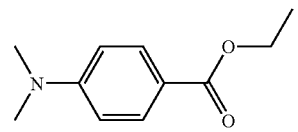

<<Ink Jet Image Forming Method>>

The ink composition sets 1 and 2 prepared in the above were charged to the ink jet recording apparatus equipped with a piezoelectric type ink jet nozzle configured as shown in FIG. 1, and the ink composition sets 3 to 5 prepared in the above were charged to the ink jet recording apparatus equipped with a piezoelectric type ink jet nozzle configured as shown in FIG. 2. Image formation was consecutively carried out according to the procedures described in the next onto web recording materials of 600 mm wide and 500 m long individually having surface energies listed in Table 6.

The ink supply system comprises an ink tank, a feeder pipe, a front-chamber ink tank placed immediately before the head, a piping with a filter, and a piezoelectric head, in which a portion from the front-chamber ink tank up to the head portion was thermally insulated and heated to 50° C. The piezoelectric head was operated so as to consecutively eject the individual inks in multi-dot sizes variable from 2 to 15 pl in a 720×720-dpi resolution. After the ink was instantaneously cured (within 2 seconds after the ink placement) using an irradiation means disposed on both sides of the carriage, or on the upstream side. After the recording, the total ink thickness was found to be within a range from 2.3 to 13 μm. It is to be noted herein that "dpi" in the context of the present invention refers to the number of dots per 2.54 cm.

TABLE 6

| | | Recording material | | Type of irradiation light source | System of recording apparatus | Irradiation conditions | | Remarks |
|---|---|---|---|---|---|---|---|---|
| | | | | | | On the surface of recording material | | |
| Sample No. | Ink set No. | Type | Surface energy (mN/m) | | | Peak wavelength (nm) | Maximum illuminance (mW/cm²) | |
| 1 | 1 | OPP | 38 | 1 | FIG. 1 | 365 | 650 | Comparative example |
| 2 | 1 | PET | 53 | 1 | FIG. 1 | 365 | 650 | Comparative example |
| 3 | 1 | shrinkable OPS | 39 | 1 | FIG. 1 | 365 | 650 | Comparative example |
| 4 | 1 | cast-coated paper | water-absorptive material | 1 | FIG. 1 | 365 | 650 | Comparative example |
| 5 | 2 | OPP | 38 | 1 | FIG. 1 | 365 | 650 | Invention |
| 6 | 2 | PET | 53 | 1 | FIG. 1 | 365 | 650 | Invention |
| 7 | 2 | shrinkable OPS | 39 | 1 | FIG. 1 | 365 | 650 | Invention |
| 8 | 2 | cast-coated paper | water-absorptive material | 1 | FIG. 1 | 365 | 650 | Invention |
| 9 | 3 | OPP | 38 | 2 | FIG. 2 | 365 | 40 | Invention |
| 10 | 3 | PET | 53 | 2 | FIG. 2 | 365 | 40 | Invention |
| 11 | 3 | shrinkable OPS | 39 | 2 | FIG. 2 | 365 | 40 | Invention |
| 12 | 3 | cast-coated paper | water-absorptive material | 2 | FIG. 2 | 365 | 40 | Invention |

TABLE 6-continued

|  |  | Recording material |  | Irradiation conditions | | On the surface of recording material | | |
|---|---|---|---|---|---|---|---|---|
| Sample No. | Ink set No. | Type | Surface energy (mN/m) | Type of irradiation light source | System of recording apparatus | Peak wave- length (nm) | Maximum illuminance (mW/cm²) | Remarks |
| 13 | 4 | OPP | 38 | 2 | FIG. 2 | 365 | 40 | Invention |
| 14 | 4 | PET | 53 | 2 | FIG. 2 | 365 | 40 | Invention |
| 15 | 4 | shrinkable OPS | 39 | 2 | FIG. 2 | 365 | 40 | Invention |
| 16 | 4 | cast-coated paper | water-absorptive material | 2 | FIG. 2 | 365 | 40 | Invention |
| 17 | 5 | OPP | 38 | 2 | FIG. 2 | 365 | 40 | Invention |
| 18 | 5 | PET | 53 | 2 | FIG. 2 | 365 | 40 | Invention |
| 19 | 5 | shrinkable OPS | 39 | 2 | FIG. 2 | 365 | 40 | Invention |
| 20 | 5 | cast-coated paper | water-absorptive material | 2 | FIG. 2 | 365 | 40 | Invention |

Details of the abbreviations for the individual recording materials listed in Table 6 are as follows:
OPP: oriented polypropylene;
PET: polyethylene terephthalate; and
shrinkable OPS: commercial oriented polystyrene for shrinkable use.

Details of the irradiation light source listed in Table 6 are as follows:

irradiation light source 1: 120 W/cm metal halide lamp (product of Japan Storage Battery Co., Ltd., MAL 400NL, 3-kW power source); and irradiation light source 2: cold cathode ray tube (product of Hybec Corporation, power consumption of light source of less than 1 kW·hr).

<<Evaluation of Ink Jet Recorded Image>>

The individual images recorded by the above image forming methods were subjected to the evaluations below.

(Evaluation of Wrinkling and Curling)

The printed matter was picked up by hands immediately after the printing, and visually checked for wrinkling and curling ascribable to the irradiation and curing based on the following evaluation criteria:

A: no wrinkling and curling;
B: a slight wrinkling and curling observed, but within a practically allowable level;
C: a strong wrinkling and curling observed in the printed matter, only available with difficulty.

(Text Quality)

A text in 6-point Ming type was printed using Y, M, C and K inks so as to attain a target density, observed under a magnifying glass, and text quality was evaluated according to the following evaluation criteria:

A: no jaggy;
B: a slight jaggy observed;
C: jaggy observed but the text is recognizable, kept in a barely allowable level; and
D: strong jaggy, the text blurred, practically not available.

(Color Mixing (Blotting))

A text was printed at 720 dpi using Y, M, C and K inks so that every adjacent dots have different colors, visually observed for the degree of blotting under a magnifying glass, and the color mixing was evaluated according to the criteria below:

A: adjacent dots keep true circular form without blotting;
B: adjacent dots keep nearly true circular form and hardly show blotting;
C: adjacent dots blot and deform a little, but keep a barely allowable level; and
D: adjacent dot blot and mix, and unavailable.

Results of the evaluations based on the above criteria are shown in Table 7.

TABLE 7

| | Results of evaluation | | | |
|---|---|---|---|---|
| Sample No. | Winkle, Curl | Text quality | Color mixing | Remarks |
| 1 | C | C | B | Comparative example |
| 2 | C | B | C | Comparative example |
| 3 | C | C | B | Comparative example |
| 4 | B | C | B | Comparative example |
| 5 | A | B | B | Invention |
| 6 | A | B | C | Invention |
| 7 | B | B | B | Invention |
| 8 | A | B | B | Invention |
| 9 | A | B | B | Invention |
| 10 | A | B | B | Invention |
| 11 | A | A | A | Invention |
| 12 | A | B | A | Invention |
| 13 | A | B | B | Invention |
| 14 | A | B | A | Invention |
| 15 | A | A | A | Invention |
| 16 | A | A | A | Invention |
| 17 | A | A | A | Invention |
| 18 | A | A | A | Invention |
| 19 | B | B | B | Invention |
| 20 | A | B | B | Invention |

As is obvious from Table 7, the image forming method of the present invention using the ink sets which comprise the active ray curable ink jet solventless inks was successful in forming high-definition images on a variety of recording materials, while ensuring a better text quality than that in the comparative examples, and without causing color mixing, winkling or curling in the printed matter.

As described above, the present invention is successful in providing the active ray curable ink jet solvent less ink, the image forming method using the ink and the ink jet recording apparatus, all of which being capable of forming high-definition images which have an excellent text quality and show no color mixing, wrinkling nor curling of the printed matters, without ruining texture of the printed matters even when the printing was made on a variety of recording materials.

The entire disclosure of Japanese Patent Applications No. Tokugan 2002-343435 filed on Nov. 27, 2002 including specification, claims drawings and summary are incorporated herein by reference in its entirety.

What is claimed is:

1. An active ray curable ink jet solventless ink comprising:
   a photo-initiator,
   a bifunctional or higher acrylate compound having a structure expressed by general formula (1) in an amount of less than 80% by mass,
   a trifunctional or higher acrylate compound in an amount of less than 10% by mass, and
   at least one species of tertiary amine compound;
   wherein the general formula (1) is

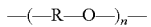

where, R represents an alkyl group, and n represents an integer of 1 or larger.

2. The ink of claim 1, further comprising: a monofunctional acrylate compound in an amount of 65% by mass or more.

3. The ink of claim 1, wherein the ink has an ink viscosity of 35 to 70 mPa·s at 30° C.

4. An image forming method for forming an image on a recording material, comprising:
   ejecting ink droplets of the active ray curable ink jet solventless ink of claim 1 through an ink jet recording head, and
   irradiating the ink with an active ray within 0.001 to 2.0 seconds after the ink droplets reach the recording material.

5. An image forming method for forming an image on a recording material, comprising:
   ejecting ink droplets of the active ray curable ink jet solventless ink of claim 1 through an ink jet recording head, and
   irradiating the ink with an active ray after the ink droplets reach the recording material;
   wherein the total thickness of ink film obtained after the ink droplets are cured by irradiating the ink droplets with the active ray, measures 2 to 20 µm.

6. An image forming method for forming an image on a recording material, comprising:
   ejecting ink droplets of the active ray curable ink jet solventless ink of claim 1 through an ink jet recording head,
   wherein each ink droplet ejected from the nozzles of the ink jet recording head, amounts to 1 to 15 pl.

7. An ink jet recording apparatus used for the image forming method of claim 4, wherein total power consumption of a light source for irradiating the ink with the active ray, amounts to less than 1 kw·hr.

8. An ink jet recording apparatus used for the image forming method of claim 5, wherein total power consumption of a light source for irradiating the ink with the active ray, amounts to less than 1 kw·hr.

9. An ink jet recording apparatus used for the image forming method of claim 6, wherein total power consumption of a light source for irradiating the ink with the active ray, amounts to less than 1 kw·hr.

10. An active ray curable ink jet solventless ink comprising:
    a photo-initiator,
    a bifunctional or higher acrylate compound having a structure expressed by general formula (1) in an amount of less than 80% by mass,
    a trifunctional or higher acrylate compound in an amount of less than 10% by mass, and
    at least one species of photo-polymerizable tertiary amine monomer;
    wherein the general formula (1) is

where, R represents an alkyl group, and n represents an integer of 1 or larger.

11. The ink of claim 10, further comprising: a monofunctional acrylate compound in an amount of 65% by mass or more.

12. The ink of claim 10, wherein the ink has an ink viscosity of 35 to 70 mPa·s at 30° C.

13. An image forming method for forming an image on a recording material, comprising:
    ejecting ink droplets of the active ray curable ink jet solventless ink of claim 10 through an ink jet recording head, and
    irradiating the ink with an active ray within 0.001 to 2.0 seconds after the ink droplets reach the recording material.

14. An image forming method for forming an image on a recording material, comprising:
    ejecting ink droplets of the active ray curable ink jet solventless ink of claim 10 through an ink jet recording head, and
    irradiating the ink with an active ray after the ink droplets reach the recording material;
    wherein the total thickness of ink film obtained after the ink droplets are cured by irradiating the ink droplets with the active ray, measures 2 to 20 µm.

15. An image forming method for forming an image on a recording material, comprising:
    ejecting ink droplets of the active ray curable ink jet solventless ink of claim 10 through an ink jet recording head,
    wherein each ink droplet ejected from the nozzles of the ink jet recording head, amounts to 1 to 15 pl.

16. An ink jet recording apparatus used for the image forming method of claim 13, wherein total power consumption of a light source for irradiating the ink with the active ray, amounts to less than 1 kw·hr.

17. An ink jet recording apparatus used for the image forming method of claim 14, wherein total power consumption of a light source for irradiating the ink with the active ray, amounts to less than 1 kw·hr.

18. An ink jet recording apparatus used for the image forming method of claim 15, wherein total power consumption of a light source for irradiating the ink with the active ray, amounts to less than 1 kw·hr.

19. An active ray curable ink jet solventless ink comprising: a photo-initiator, a bifunctional or higher acrylate compound having a structure expressed by general formula (1) in an amount of less than 35% by mass, a monofunctional acrylate compound in an amount of 65% by mass or more, and at least one species of tertiary amine compound:

wherein the general formula (1) is $$-(-R-O-)_n-$$

where, R represents an alkyl group, and n represents an integer of 1 or larger.

20. The ink of claim 19, further comprising: a trifunctional or higher acrylate compound in an amount of less than 10% by mass.

21. An active ray curable ink jet solventless ink comprising:
  a photo-initiator,
  a bifunctional or higher acrylate compound having a structure expressed by general formula (1) in an amount of less than 35% by mass,
  a monofunctional acrylate compound in an amount of 65% by mass or more, and
  at least one species of photo-polymerizable tertiary amine monomer;

wherein the general formula (1) is $$-(R-O-)_n-$$

where, R represents an alkyl group, and n represents an integer of 1 or larger.

22. The ink of claim 21, further comprising: a trifunctional or higher acrylate compound in an amount of less than 10% by mass.

* * * * *